US005804930A

United States Patent [19]

Panto

[11] Patent Number: 5,804,930

[45] Date of Patent: Sep. 8, 1998

[54] MOTOR OPERATOR FOR A POWER LINE PHASE SWITCH

[75] Inventor: Andrew S. Panto, Matthews, N.C.

[73] Assignee: Southern Electrical Equipment Company, Charlotte, N.C.

[21] Appl. No.: 684,981

[22] Filed: Aug. 22, 1996

[51] Int. Cl.[6] .............................. H01H 3/00; H02K 7/14

[52] U.S. Cl. .............................. 318/3; 318/12; 318/479; 200/48 KB; 335/69

[58] Field of Search .............................. 335/68, 69, 77; 200/48 R, 48 KB; 318/3, 9–15, 445, 478, 479

[56] References Cited

U.S. PATENT DOCUMENTS

| | | | |
|---|---|---|---|
| 2,462,342 | 2/1949 | Trogner | 200/48 KB |
| 3,226,499 | 12/1965 | Curtis et al. | 200/48 R |
| 3,243,534 | 3/1966 | Turner | 200/48 A |
| 3,255,332 | 6/1966 | Curtis et al. | 200/48 R |
| 3,382,330 | 5/1968 | Bernatt et al. | 200/48 A |
| 3,388,297 | 6/1968 | Curtis et al. | 361/61 |
| 3,409,815 | 11/1968 | Wright et al. | 320/134 |
| 3,432,780 | 3/1969 | Evans et al. | 335/68 |
| 3,530,263 | 9/1970 | Joyce | 200/48 SB |
| 3,647,996 | 3/1972 | Bernatt et al. | 200/48 R |
| 3,665,348 | 5/1972 | Haydon et al. | 335/68 |
| 3,780,625 | 12/1973 | Weston et al. | 91/418 |
| 4,095,061 | 6/1978 | Bridges | 200/48 KB |
| 4,110,579 | 8/1978 | Frink et al. | 218/12 |
| 4,357,505 | 11/1982 | Bridges | 200/48 KB |
| 5,311,108 | 5/1994 | Willard | 318/381 |

*Primary Examiner*—Brian Sircus
*Attorney, Agent, or Firm*—Nixon & Vanderhye PC

[57] ABSTRACT

A motor operator is configured to provide local and remote operation of a power line phase switch. The motor operator has its components individually enclosed in a component enclosure and further enclosed in a main enclosure, allowing isolation and protection of the components from the environment and operators. A gear box includes a worm gear reducer submersed in oil providing a no maintenance gear train that makes continuous braking unnecessary by virtue of the inherently self-locking nature of the worm gear. The motor operator also includes a plurality of limit and auxiliary switches providing local and remote indication of switch position. The switches are each independently adjustable using cam adjustment collars. The overall configuration of the motor operator provides safe, reliable and cost effective phase switch operation.

18 Claims, 2 Drawing Sheets

MOTOR OPERATOR FOR A POWER LINE PHASE SWITCH

TECHNICAL FIELD

The present invention relates to overhead power line phases and, more particularly, to a motor operator for controlling a contact position of a power line phase switch.

BACKGROUND

In a power line phase switch, a contact blade or knife blade is either rotated or reciprocated into and out of engagement with a contact clip assembly to connect and disconnect the switch. A motor operator for a power line phase switch enables local and remote operation of the phase switch.

Typically, a motor operator for a power line phase switch includes a motor for driving the contact blade and limit switches indicating contact blade position locally and/or remotely. Conventional motor operators, however, suffer from a number of drawbacks. With respect to the gear box, conventional motor operators generally include exposed gearing requiring high maintenance, particularly in a severe environment. In addition, some gear reducer configurations are disadvantageously capable of being backdriven from the output shaft. With respect to braking, some motor operators require continuous braking by virtue of their gear reducing configuration. Moreover, overtravel is prevented using a solenoid actuated brake, which is often unreliable. Typically, auxiliary and limit switches in the motor operator are not independently adjustable. Finally, the components of the motor operator are generally disposed both inside and outside of a main enclosure or cabinet. Elements subject to environmental conditions more readily require maintenance and/or replacement.

SUMMARY OF THE INVENTION

It is therefore an object of the invention to provide a motor operator for a power line phase switch that overcomes the drawbacks associated with conventional motor operators. It is a further object of the invention to provide a motor operator that reliably and efficiently provides local and remote operation of a power line phase switch.

These and other objects of the invention are achieved by providing a motor operator for a power line phase switch including a main enclosure, a power source disposed within the enclosure, a motor coupled with the power source that is disposed within the enclosure, a gear box housing a gear train coupled to the motor and also disposed within the enclosure, and a plurality of auxiliary and limit switches disposed within the enclosure communicating with the gear train. The gear train includes an output shaft that is adapted to engage a contact blade of the phase switch.

The gear box is preferably filled with a lubricating oil such that the gear train is immersed in oil. The gear train may include a worm gear configuration. Preferably, both the main enclosure and the gear box are sealed from the environment. The heater unit may be disposed within the enclosure, which includes a recirculating fan. The power source may include a plurality of batteries and a battery charger. The auxiliary and limit switches are preferably mounted to a corresponding plurality of adjusting collars wherein each of the collars is independently adjustable. A coupling securing the output shaft and the contact blade is disposed outside of the enclosure. In one arrangement, the motor operator further includes a remote terminal unit and a radio also disposed within the enclosure.

In accordance with another aspect of the invention, there is provided a motor operator for a power line phase switch including a power source unit, a motor coupled with the power source unit, a gear box housing a gear train coupled to the motor, and a plurality of auxiliary and limit switches communicating with the gear train. In this regard, the gear train includes an output shaft that is adapted to engage a contact blade of the phase switch, and the gear box is filled wish a lubricating oil such that the gear train is immersed in oil.

BRIEF DESCRIPTION OF THE DRAWINGS

These and other aspects and advantages of the present invention will be described in detail with reference to the accompanying drawings, in which:

FIG. 1 is an elevation view of the motor operator according to the present invention; and.

DETAILED DESCRIPTION OF PREFERRED EMBODIMENTS

Figure 1:
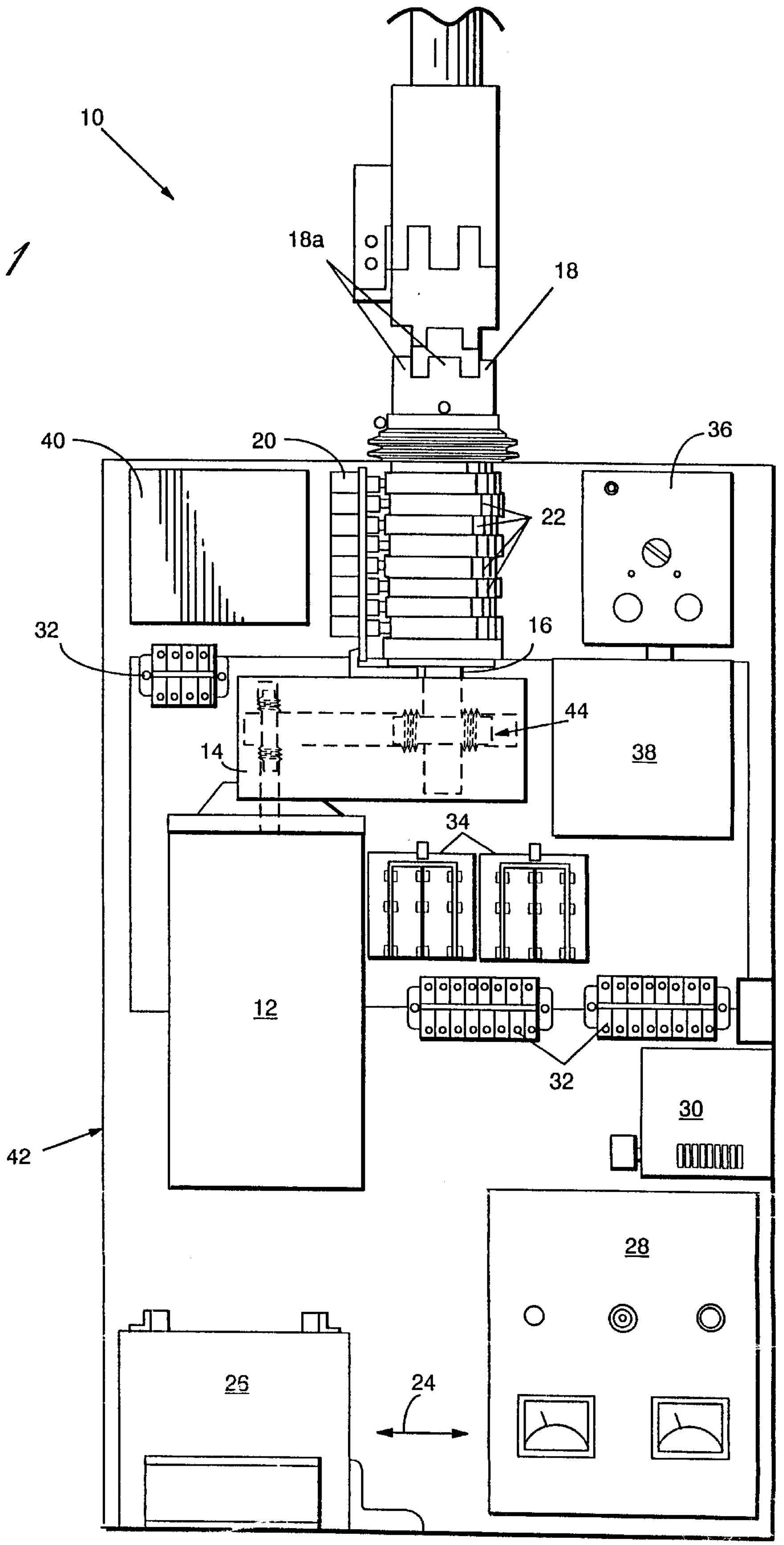

FIG. 1 illustrates the motor operator according to the present invention. As noted above, a motor operator for a power line phase switch provides for local and remote operation of the phase switch contact blade. The motor operator 10 includes a motor 12, preferably a 24 volt DC motor, that is coupled through a gear box 14 to an output shaft 16. A coupling 18 is secured to an exterior end of the output shaft 16 and transmits the drive from the motor 12 through the gear box 14 to a phase switch contact blade (not shown) for controlled movement between a connected position and a disconnected position. The coupling 18 includes castellated shoulders **18*a*** to ensure coupling in the correct position throughout the full 360 degrees of rotation.

A plurality of limit and auxiliary switches are disposed adjacent the output shaft 16. The switches 20 are secured to the output shaft 16 by a corresponding plurality of adjusting collars 22 (described below).

The motor operator 10 also includes a power source unit 24. The power source unit 24 includes a battery pack 26, preferably having a plurality of 12 volt batteries and a battery charger 28. A heater unit 30 is provided to prevent condensation inside the enclosure and includes a recirculating fan. The motor operator 10 also includes a plurality of AC and DC terminal blocks 32 for site connections of, for example, AC voltage source or auxiliary switch position indication output or the like. AC and DC knife switches 34 are also included for local connection and disconnection of the switch. A controller 36 communicating with control relays 38 allows local and/or remote operation of the motor operator using position indication from two of the switches 20. Finally, the motor operator also includes an alarm unit 40 that monitors voltage and sends an alarm signal in accordance with predetermined criteria.

The separately housed components of the motor operator are all preferably secondarily enclosed in a main enclosure 42. The enclosure includes a water channel and a gasketed door (not shown) to provide protection against wind-blown dust, rain and hose directed water and the like. Air vents (not shown) are provided on the side panels to help prevent condensation. The coupling 18 is located external to the main enclosure and allows manual operation of the switch without requiring opening of the enclosure.

The gear box 14 connected between the motor 12 and the output shaft 16 includes a worm gear reducer 44. By virtue of the worm gear configuration as opposed to for example a bevel gear reducer, the gear box is inherently self-locking from the output shaft. Thus, no added braking is necessary to secure the output shaft. Moreover, the worm gear mechanism prohibits the gear train from being backdriven from the output shaft. Thus, the switch cannot be opened or closed unless the motor drives the shaft. The gear train is provided with a separate gear reducer output shaft seal and cabinet output shaft seal (not shown) that decrease the possibility of contamination in the interior of the gear box. In addition, the gear box 14 is filled with lubricating oil such that the gear train 44 is immersed in oil. As a result, corrosion is eliminated and the gear train requires no maintenance.

A known method of dynamic braking is used to prevent overtravel of the motor with respect to the preset limit switches. In this method, the magnetic pole of the motor is reversed by shorting the leads on the motor, and the motor is used as its own brake. When the open limit switch, for example, is actuated indicating that the phase switch is open, the controller 36 disconnects power to the motor 12 and actuates the dynamic brake.

Figure 2:
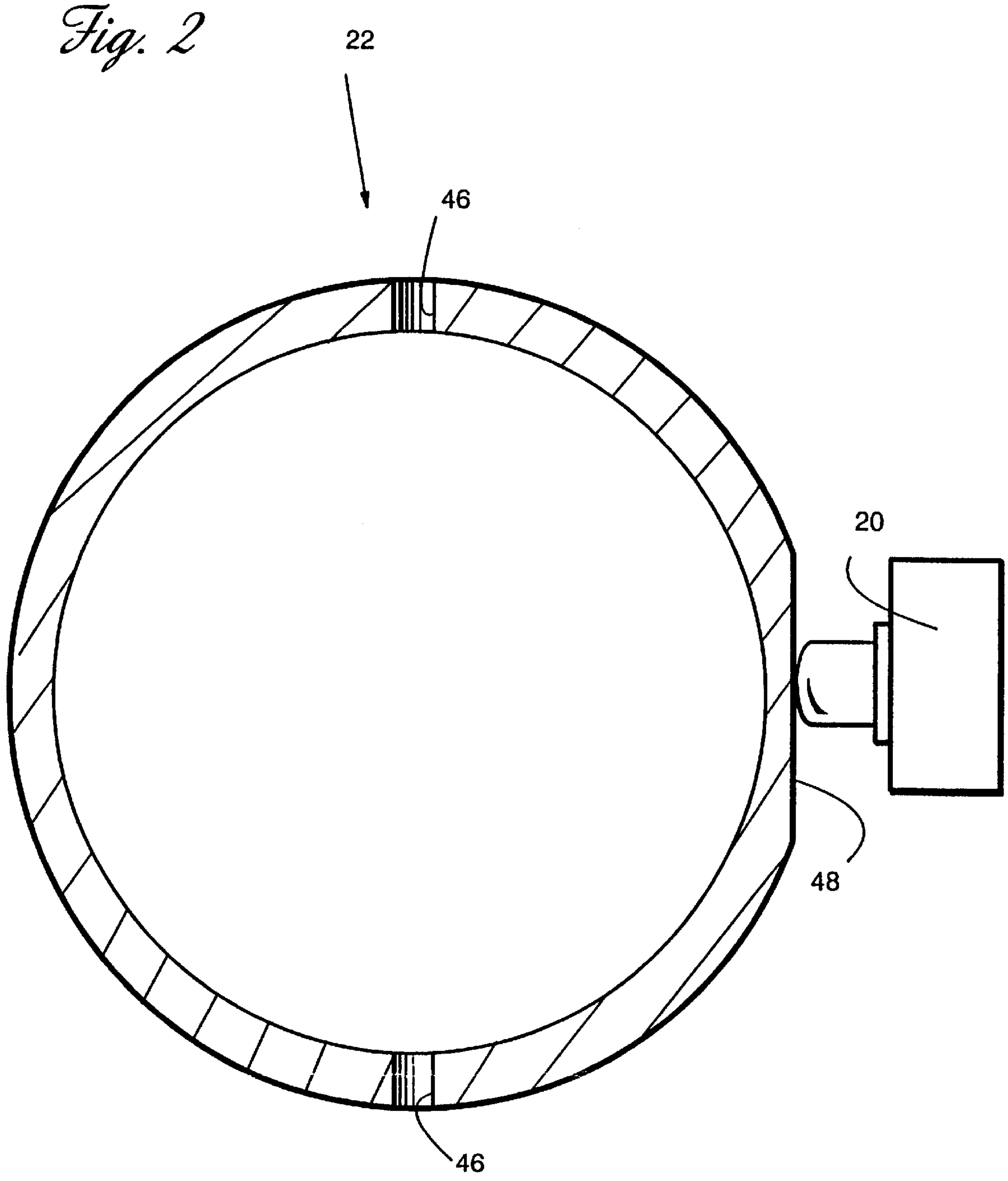
FIG. 2 is a plan view of a switch adjustment collar.

FIG. 2 illustrates a switch adjusting collar 22 for the limit and auxiliary switches 20. The collars are secured to the outside diameter of the output shaft 16 by one or more set screws secured through a corresponding one or more screw apertures 46. A cam portion 48 serves to actuate and deactuate the limit switches 20. At least two switches 20 are provided to indicate the switch open position and the switch closed position, respectively. The signals from the switches 20 are used to signal the controller to disconnect power to the motor 12 and apply the dynamic brake and provide local and remote switch position indication. Additional (auxiliary) switches may be provided for, for example, digital input to an RTU for remote position indication, relaying applications whereby a switch located nearby may require position indication of an associated switch, or the like. By virtue of the switch adjusting collars 22, the switches 20 are thus independently adjustable.

The motor operator according to the present invention provides a safe, reliable and cost effective apparatus for both local and remote operation of a power line phase switch. The component individual enclosures that are all further enclosed in a main enclosure allows isolation and protection of the components from the environment and operators. The addition of a gear box including a worm gear reducer submersed in oil achieves significant advantages by virtue of its inherently self-locking structure and little or no maintenance. The enclosure is sized to also include a remote terminal unit (RTU) and a radio unit to provide remote communication from within the main enclosure. In one arrangement, the motor operator is also provided with a monitoring system such as that disclosed in commonly owned, co-pending U.S. Pat. application Ser. No. 08/650,131, the disclosure of which is hereby incorporated by reference.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A motor operator for a power line phase switch, comprising:

a main enclosure;

a power source unit disposed within said enclosure;

a motor coupled with said power source unit, said motor being disposed within said enclosure;

a gear box housing a reducing gear train coupled to said motor, said gear box being disposed within said enclosure, wherein said gear train includes an output shaft that is adapted to engage a contact blade of the phase switch; and a plurality of auxiliary and limit switches communicating with said gear train, said auxiliary and limit switches being disposed within said enclosure.

2. A motor operator for a power line phase switch, comprising:

a main enclosure, a power source unit disposed within said enclosure;

a motor coupled with said power source unit, said motor being disposed within said enclosure;

a gear box housing a gear train coupled to said motor, said gear box being disposed within said enclosure, wherein said gear train includes an output shaft that is adapted to engage a contact blade of the phase switch, and wherein said gear box is filled with a lubricating oil such that said gear train is immersed in oil; and a plurality of auxiliary and limit switches communicating with said gear train, said auxiliary and limit switches being disposed within said enclosure.

3. A motor operator according to claim 2, wherein said gear train comprises a worm gear.

4. A motor operator according to claim 3, wherein said main enclosure is sealed, and wherein said gearbox is sealed.

5. A motor operator according to claim 1, further comprising a heater unit disposed within said enclosure.

6. A motor operator according to claim 5, wherein said heater unit comprises a recirculating fan.

7. A motor operator according to claim 1, wherein said power source comprises a plurality of batteries and a battery charger.

8. A motor operator according to claim 1, wherein said plurality of auxiliary and limit switches are mounted adjacent a corresponding plurality of adjusting collars, wherein each of said collars is independently adjustable.

9. A motor operator according to claim 8, wherein each of said adjusting collars comprises an inner diameter substantially corresponding to an outer diameter of said output shaft and a cam portion that actuates and deactuates the switches, respectively.

10. A motor operator according to claim 1, further comprising a coupling securing said output shaft and the contact blade, said coupling being disposed outside of said enclosure.

11. A motor operator according to claim 1, further comprising a remote terminal unit (RTU) and a radio disposed within said enclosure.

12. A motor operator for a power line phase switch, comprising:

a power source unit;

a motor coupled with said power source unit;

a gear box housing a gear train coupled to said motor, said gear train including an output shaft that is adapted to engage a contact blade of the phase switch, wherein said gear box is filled with a lubricating oil such that said gear train is immersed in oil; and a plurality of auxiliary and limit switches communicating with said gear train.

13. A motor operator according to claim 12, wherein said gear train comprises a worm gear.

14. A motor operator according to claim 12, further comprising a heater unit including a recirculating fan.

15. A motor operator according to claim 12, wherein said power source comprises a plurality of batteries and a battery charger.

16. A motor operator according to claim 12, wherein said plurality of auxiliary and limit switches are mounted to a corresponding plurality of adjusting collars, wherein each of said collars is independently adjustable.

17. A motor operator according to claim 1, wherein said gear train comprises a worm gear.

18. A motor operator according to claim 1, wherein said main enclosure is sealed, and wherein said gearbox is sealed.

* * * * *

UNITED STATES PATENT AND TRADEMARK OFFICE

CERTIFICATE OF CORRECTION

PATENT NO. : 5,804,930
DATED : September 8, 1998
INVENTOR(S) : Andrew S. PANTO

It is certified that error appears in the above-identified patent and that said letters patent is hereby corrected as shown below:

Column 2, line 9, replace "wish" with -- with --.

Signed and Sealed this

Fifth Day of January, 1999

*Attest:*

*Attesting Officer*

*Acting Commissioner of Patents and Trademarks*